March 13, 1956 E. MAHLKUCH 2,738,065
METHOD OF AND APPARATUS FOR PROCESSING MATERIALS
Filed Jan. 4, 1951 2 Sheets-Sheet 1
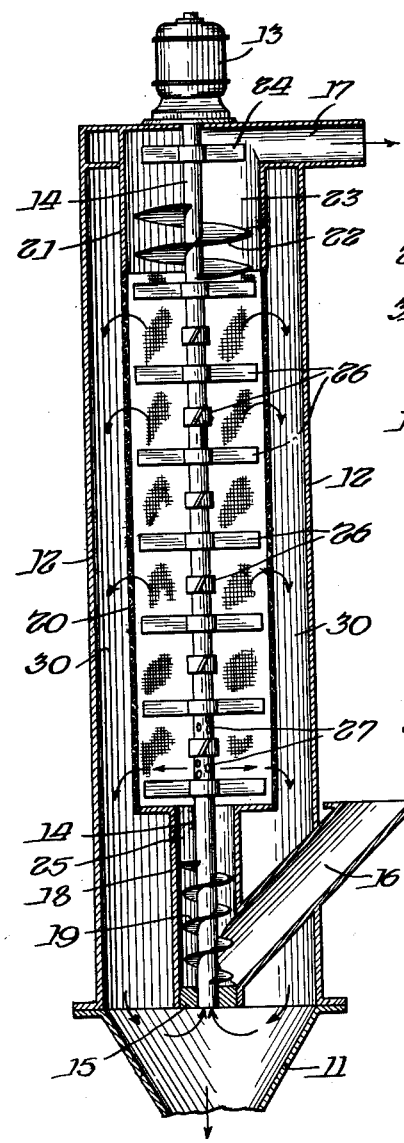
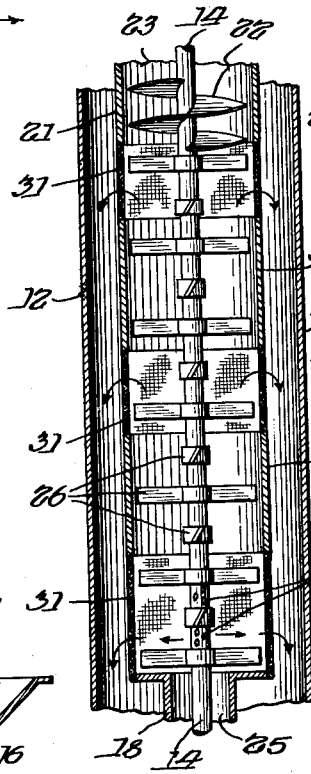
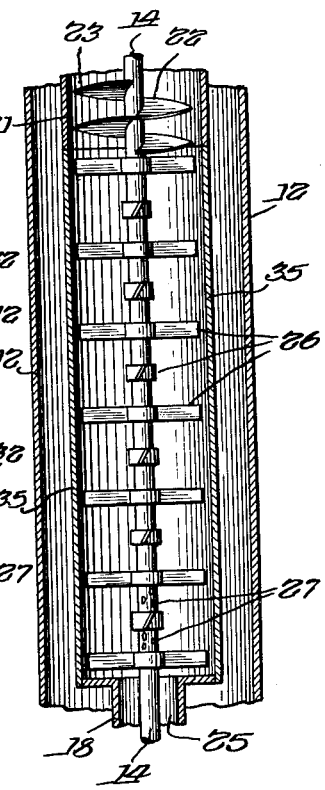
Inventor.
Eva Mahlkuch.

March 13, 1956 — E. MAHLKUCH — 2,738,065
METHOD OF AND APPARATUS FOR PROCESSING MATERIALS
Filed Jan. 4, 1951 — 2 Sheets-Sheet 2
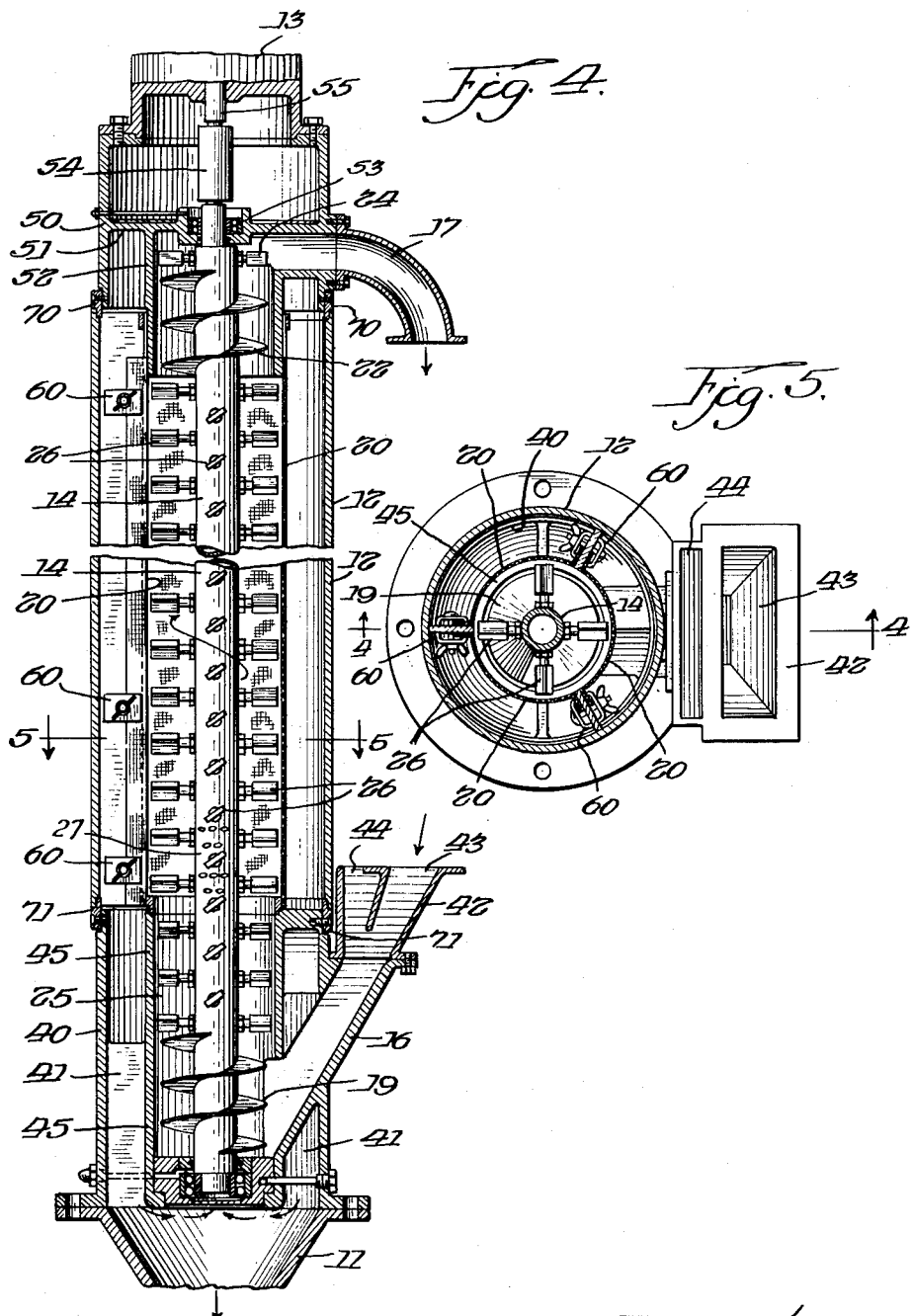
Inventor.
Eva Mahlkuch

United States Patent Office 2,738,065
Patented Mar. 13, 1956

2,738,065

METHOD OF AND APPARATUS FOR PROCESSING MATERIALS

Eva Mahlkuch, Luebeck, Germany

Application January 4, 1951, Serial No. 204,319

8 Claims. (Cl. 209—28)

This invention is concerned with apparatus for processing granular or finely divided materials.

The designation "granular materials" is intended to mean, e. g., milled products such as flour, bran, cereals, etc., and in certain kinds of processing the designation is intended to mean products such as chocolate, cocoa, sugar or the like.

The term "processing" is intended to mean treatment such, for example, as the finishing of bran for the purpose of extracting residual flour particles therefrom; or treatment designed to obtain the blending of materials such as cocoa and sugar, for example, during the conveying thereof from one place to another; or the treatment of milled products such as flour and the like for the mechanical destruction of infestation; or, finally, the treatment of products such as flour or other materials by gases.

The materials and the treatments mentioned above are given as examples only. The apparatus disclosed herein may be found useful for the processing or handling of other products and materials, for additional and different treatment purposes.

Some of the uses to which the new apparatus may be put will now be briefly indicated to furnish a basis for the understanding of the detailed description of examples of the invention, which will presently be rendered.

One example of the use of the invention is as a bran finisher. In known bran finishers and sifters, the bran is conveyed horizontally through a chamber provided with a perforated casing and containing a rotor having beater arms which act upon the bran in a beating and brushing action to separate residual flour therefrom. The flour particles which are separated flow downwardly through the casing holes for discharge. The horizontal arrangement of the known apparatus requires a great deal of floor space and, where recirculation is desired, or subsequent treatment of the bran, relatively complicated and costly conduits are necessary which convey the discharged bran upwardly for subsequent feed to an additional sifter or finisher. Such known machines also impose limitations as to the efficiency of the treatment and as to the yield.

It is an object of the invention to provide a machine for use, e. g., as a bran finisher which accomplishes the finishing operations while conveying the material vertically upwardly, discharging the coarse bran particles at the top and the flour at the bottom.

The immediately perceivable advantage of such a structure will be recognized in the great saving of floor space. The new machine calls for only a fraction of the floor space, about one-tenth of the floor space, needed for known finishers of this type. This space-saving feature is important because such finishers are usually installed in mills which are in operation and in which there is little space available for auxiliary equipment.

Another advantage resides in greater efficiency because, in the horizontal arrangements of known machines, the material masses by gravity in the finishing chamber at the bottom thereof and the entire area of the chamber therefore cannot become effective for the finishing treatment. In the vertical arrangement, as contemplated by the invention, the material is conveyed upwardly, and is then affected by air currents and by the action of beater arms, within a certain section of the machine; that is to say, it is moved upwardly within a treatment zone while suspended in an air current, and therefore the entire area of the finishing casing in such treatment zone can become effective. The treatment path is longer than in known machines, and the material is more efficiently treated by the beater arms because the negative slipping of the material moving upwardly in suspension in the air current causes it to be subjected to the action of the beater arms repeatedly, therefore resulting in a greater yield and more effective treatment. Substantially all flour particles are removed from the bran and the latter is discharged at the top of the machine.

Another object is to provide screw or worm means at the bottom and top of the new machine so as to effect positive feed and discharge of material portions and to provide air locks for the purpose of avoiding undesired air circulation at the opposite ends of the machine, thus confining the air circulation and the upward conveying of the material in suspension in air currents to a definite portion of the machine, i. e., to a principal treatment zone.

A further object of the invention is to provide means for controlling the circulation of the air through the principal treatment zone of the machine, between the air locks mentioned in the preceding paragraph, where the bran is subjected to the finishing treatment.

If material such as flour is to be subjected to a gas treatment, a desired gas will take the place of the air circulated through the principal treatment zone of the machine. The air circulation prevents massing of the material along the casing walls as well as discharge of flour particles with the bran. Undue heating of the material is avoided, thus preventing condensation effects on the casing wall and consequently plugging of the perforations thereof. In case of gas treatment, the gas is confined to the treatment zone.

Still another object is to provide an inner tubular perforated casing or screen in the machine, within the treatment zone, against which the bran is thrown by the action of rotating beater arms operating at high peripheral speeds. These beater arms act on the bran to separate the flour therefrom, which moves through the perforations in the screen radially into an annular chamber for discharge at the bottom. The screen provides for a large surface which is operatively effective throughout its area.

The tubular perforated casing or screen defining the principal treatment zone may be provided in sections alternating with solid imperforate sections against which the bran is thrown by the action of the beater arms to separate the flour therefrom, thus improving and facilitating the flour extraction and increasing the yield.

The solid tubular inner casing sections may be roughened or provided with suitable projections so as to facilitate the finishing action of the beater arms on the bran. The force of impact of the bran and flour on the inner walls of these solid sections and on the projections thereon or roughened surfaces thereof provides for an infestation destruction effect. The term "roughened" is intended to include structures provided with projections or the like.

If desired, the inner casing may be solid throughout, made of ceramic material or of riffled, cast plates, roughened on the inside or carrying suitable impact projections, and the machine will in this case operate principally as a device, in the case of treatment of bran, for example, for separating residual flour particles from the bran and, in the case of use for destroying insect life in flour, it will operate principally as a device for destroying infestation.

Such embodiment of the invention may also be used as a blending device for quantities of materials fed thereto, e. g., for blending cocoa and sugar to obtain a homogeneously intermixed product.

The beater arms employed in the new machine are relatively short to prevent undue agitation of the material which would impede the impact thereof on the casing wall forming the treatment zone. The diameter of the treatment zone is small so as to assure the impact effect. The beater arms are disposed at angles of about 20°–30°, depending on the material to be treated, and revolve at high peripheral speeds on the order of 1000–1500 m./min.

A plurality of machines such as disclosed may be employed to operate in series relationship. For example, one machine may operate as a bran finisher and the flour discharged from such machine may be passed through a second, similar machine which operates to destroy infestation or to treat the flour with a desired gas or the like.

The objects and features indicated above and other objects and features will now be described with reference to the accompanying drawings. In these drawings, Fig. 1 shows in diagrammatic manner an embodiment of the invention for use, for example, as a bran finisher;

Fig. 2 illustrates a modification of the machine having an inner casing forming part of the principal treatment zone and comprising solid and perforate wall sections;

Fig. 3 indicates in similar diagrammatic manner a further embodiment in which the inner casing of the principal treatment zone is solid throughout, made, for example, of ceramic material or of cast plates roughened or riffled on the inside or provided with suitable projections for the purpose of treating material such as bran, principally to extract therefrom residual flour particles; or, alternatively, for the purpose of treating material such as flour for the purpose of mechanically destroying infestation;

Fig. 4 shows a constructional example of an embodiment of the machine for use as a bran finisher in diagrammatic vertical sectional view; and Fig. 5 is a diagrammatic cross-sectional view taken approximately along lines 5—5 of Fig. 4.

Like parts are indicated in the drawings by like reference numerals. Known details and elements will be discussed only to the extent required for conveying an understanding of the invention.

The device shown in Fig. 1 comprises a bottom member forming a discharge spout 11 on which is mounted an outer casing shell 12 carrying a motor 13 for driving a shaft 14. The shaft 14 is journalled at the bottom of the machine in suitable bearings 15 and may be additionally suitably journalled at the top of the machine. At the bottom is provided an inlet 16 for feeding material such, for example, as bran, to the machine for finishing therein. The flour extracted from the bran is discharged at the bottom through the funnel-like discharge portion 11, and the bran, freed of all flour particles, is discharged at 17.

A tubular bottom casing 18 is provided which accommodates a screw or worm 19 carried by the shaft 14 for positively feeding the bran supplied at 16 upwardly into the principal treatment zone or chamber which is formed by an inner perforated casing 20. The upper portion of this perforated casing 20 connects with a downwardly depending tubular portion 21 which accommodates a worm or screw 22 for positively feeding the bran freed of flour particles upwardly into the space 23 for discharge at 17. Numeral 24 indicates a paddle arm which loosens up the material on top of the chamber 23 for discharge at 17. The material moves in the space 23, driven by the screw or worm 22 in a relatively compact column which acts somewhat in the manner of an air lock to impede circulation of air to the discharge 17 at the top of the machine. At the bottom or feed end, the material is similarly moved in the space 25 in the upper portion of the tubular bottom casing 18, by the screw 19 as a relatively compact column for delivery to the principal treatment or processing zone or chamber defined by the perforated casing wall 20.

The shaft 14 carries a number of beater arms 26 which are disposed at a desired angle, for example, at an angle of 20°–30°, depending on the material to be handled to produce responsive to rotation an updraft within the principal treatment or processing zone chamber defined by the perforated casing wall 20. The diameter of this chamber exceeds the diameter of the space 25 as shown in the drawings. Accordingly, the material delivered from the space 25 to the chamber at the bottom thereof, can expand in the chamber in the presence of the updraft produced therein by the action of the rotating beater arms 26.

The shaft 14 is hollow and is provided with radial openings within the portion 27 thereof which lies within the lower part of the principal treatment chamber or zone. The updraft produced by the paddles or beater arms 26 causes an air circulation, as indicated by the arrows, drawing air through the hollow shaft 14 from the bottom upwardly, the air leaving the shaft through the radial openings in the portion 27 thereof and entering the treatment chamber to float the material upwardly, assisted by the action of the paddles or beater arms, and leaving the treatment zone radially outwardly through the holes in the wall 20, carrying along the flour particles for downward flow through the annular chamber 30 for discharge at 11.

The shaft 14 and therewith the paddles or beater arms 26 rotate at relatively high speed, the peripheral speed of the beater arms 26 being on the order of between 1000 and 1500 m./min.

As will be described later on in connection with the construction example of the invention shown in Figs. 4 and 5, the beater arms 26 are very short to avoid undesired gyration and agitation of the material within the treatment zone, which would impede the impact action of the material on the inside surface of the perforated casing wall 20.

The material fed to the machine at 16 is taken up by the screw or worm 19, moved positively upwardly, and produces within the space 25 a plug acting in the manner of an air lock which to some extent impedes air intake with the material, compelling air to be drawn into the treatment zone or chamber through the holes in the shaft and through the latter as indicated by the arrows. The material thus moves into the treatment zone at the bottom thereof and is immediately lifted by the air current created by the paddles or beater arms 26, and is acted upon by these arms which throw it in a brushing and impact action against the inside surface of the perforated wall 20 of the treatment zone or chamber. The material within the treatment zone moves in this manner upwardly in suspension in the air currents and, since there will be negative slippage of heavy particles of the material, these particles will be repeatedly subjected to the beating and brushing action of the paddles or beater arms 26. The treatment passage is relatively long, and the inner surface of the perforated wall 20 is effective throughout its entire area, bringing about efficient operation and a very much increased yield as compared with known machines of this kind.

The bran from which the flour has been extracted, in moving upwardly, finally is taken up by the screw or worm 22 which moves it into the space 23 in which the bran moves upwardly as a relatively compact column, to be finally dispersed by the paddle 24 for discharge at 17.

The air circulation within the treatment zone prevents undue heating of the material, thereby preventing undesirable condensation effects which would cause massing of the material against the inside surface of the perforated wall 20, and plugging the perforations therein.

The air inlet for the circulation within the treatment zone is merely shown in Fig. 1 as being formed by the bottom end of the hollow shaft 14. It is understood of course that a special casing may be provided at that point, with a conduit to the outside so as to draw fresh air into the apparatus for circulation in the treatment zone, as described, and for discharge with the flour at 11. In the case of using the machine for treating a product such as flour with a gas, the conduit will draw the desired gas from a corresponding gas holder. The exhaust gas or air leaves the machine together with the flour through the discharge 11. The term "gas" as used herein is intended to mean a gaseous medium including air, unless otherwise specified.

The structure described above with reference to Fig. 1 may be modified by providing a principal treatment chamber which is defined by a wall having perforated sections alternating with relatively solid sections, as shown in Fig. 2.

Referring now to Fig. 2, only the portion of the device is shown therein which contains the parts forming the principal treatment chamber and adjacent parts. At the bottom is indicated the tubular bottom portion 18 corresponding to the similarly numbered portion in Fig. 1 and having the same function. At the top is indicated the tubular insert 21 containing the screw or worm 22 coacting with the upper discharge space 23. Numeral 14 indicates the hollow shaft. The treatment zone is defined by a plurality of perforated wall sections 31 alternating with solid wall sections 32. These solid wall sections may be made of ceramic material or of cast plates assembled in tubular form, which plates may be roughened or riffled on the inside or provided with suitable projections or the like (not shown), so as to produce a more efficient brushing action of the particles on the inside walls, thereby increasing the yield of the machine.

The operation of the structure shown in Fig. 2 is identical with that described in connection with Fig. 1, except that the solid wall sections 32 subject the material, in coaction with the associated beater arms to a more intense brushing and flour-extracting action.

Within these solid wall sections 32 of the treatment zone the particles of the material will be impacted with considerable force, particularly if these solid sections 32 are roughened, riffled or provided with suitable projections, thus also producing an insect-destroying action.

Fig. 3 shows an embodiment in which the treatment zone is defined throughout by a wall 35 which is made of solid material, for example, of ceramic material or of sectional segmental cast plates assembled in tubular form and roughened on the inside or provided with riffles or suitable projections. A machine having such treatment zone will be found particularly suitable for the mechanical destruction of insect life contained, for example, in flour. There is no sifting or separating effect, but air may be admitted into the treatment chamber in the same manner as described before, so as to provide substantially the same agitation effect as in the previously described embodiments. Gas may take the place of air, as before.

The gas in this as well as in the previously described embodiments will be largely confined to the principal treatment chamber and will be substantially ineffective so far as the inlet and the discharge portions of the machine are concerned.

Referring now to Figs. 4 and 5: The machine shown therein may be a constructional example of the machine shown diagrammatically in Fig. 1. The flour discharge 11 appears accordingly again at the bottom, and mounted on this discharge member is the bottom casing 40 which may be a casting comprising the feed spout 16 and forming an annular space 41 which terminates at the bottom in the flour discharge 11. On the feed member 16 may be mounted a hopperlike structure 42 having a feed opening 43 and an adjacent small auxiliary air inlet 44. Such auxiliary air inlet may of course also be provided in the structures of Figs. 1–3. The bottom casing 40 also forms the tubular inner casing 45 for accommodating the screw or worm 19 and forming a space thereabove indicated at 25. This space with the screw 19 corresponds to identical parts of the structure, Fig. 1, forming a bottom area or feed portion in which circulation of air under control of the heater arms or paddles 26 is inhibited. The shaft 14 again carries a desired number of beater arms 26. Some of these beater arms are shown in the space 25 at the bottom, but may be omitted there, if desired, and the remaining beater arms operate as before within the principal treatment chamber defined by the perforated tubular inner casing 20. At the top is provided a head which may be in the form of a casting forming the outer wall 50 and the partition 51 from which depends the tubular inner section 52. Connected with the head casting is the bran outlet 17.

The partition 51 carries the bearing 53 for the shaft 14 to which is connected a coupling 54 connecting with the shaft 55 of the motor 13.

Within the tubular portion 52 of the upper head casting is the screw 22 and the bran discharge paddle 24. A discharge space corresponding to the space 23 of Fig. 1 may be provided above the screw 22. The screws 19 and 22 operate within the corresponding sections of the device shown in Fig. 4 as already described in connection with Fig. 1.

Air or a desired gas may be drawn into the device through radial holes provided in the hollow shaft 14 within the portion 27 thereof in the manner described in connection with Figs. 1–3.

The perforated wall 20 may be made of perforated sheet material in segmental sections 20 (see also Fig. 5) which are held together by clamps 60 to form the tubular structure.

Ceramic segmental plates or cast plate, if desired interiorly roughened, riffled or provided with projections may take the place of the sections 20 forming the perforated wall of the treatment zone. As already described, perforated sections may alternate with solid sections to result in the structure shown diagrammatically in Fig. 2.

The sections forming the wall 20 are clamped in position in top and bottom engagement with the inner ends of the tubular inner casing portions 52 and 45, respectively. The outside casing 12 may be in the form of a suitable shell, if desired in segmental sections, which are fastened at the upper end to the outer wall 50 of the head casting, as shown at 70, and similarly fastened at the lower end to the outer wall 40 of the bottom casting, as shown at 71. All parts are thus easily accessible for mounting and dismantling as may be called for. The wall portions forming the wall 20 of the principal treatment or processing chamber are in the manner shown accessible for exchange, cleaning or any other purposes.

Changes may be made within the scope and spirit of the accompanying claims.

I claim:

1. Apparatus for processing bran to extract flour therefrom comprising means forming vertically upwardly successive tubular chambers including relatively solid tubular wall means forming a feed chamber at the bottom followed by perforated tubular wall means forming an intermediate treatment chamber and relatively solid tubular wall means extending from the upper end of said perforated wall means forming on top a first discharge chamber, the inner diameter of said treatment chamber exceeding the diameter of said feed and discharge chambers, tubular relatively solid outside wall means disposed around the wall means of said chambers radially spaced therefrom and forming an annular vertically downwardly extending passage, means extending from said passage forming a delivery conduit, a rotatable shaft extending centrally vertically through all said chambers and means on top of said discharge chamber for rotating said shaft, a bore being formed in said shaft at the bottom thereof which terminates in radial holes formed therein substantially coinciding with the bottom portion of said intermediate treatment chamber, a feed conduit for feeding bran to be treated to said feed chamber at the bottom thereof, a screw on said shaft within said feed chamber for positively moving said bran upwardly in a relatively compact column for delivery at the bottom of said treatment chamber responsive to rotation of said shaft, vertically and angularly spaced angularly positioned agitating arms on said shaft for circulating air responsive to rotation thereof by drawing air into said treatment chamber through said bore and said holes therein and creating an updraft in said treatment chamber and expelling air through the perforations in the wall thereof, said bran delivered at the bottom of said treatment chamber expanding therein and being lifted therein by the action of said agitating arms and by said air circulation and the particles thereof being impacted against said perforated wall to extract flour therefrom and such flour being expelled through the perforations in said wall with the circulating air into said annular vertically downwardly extending passage for removal by way of said delivery conduit, the bran freed of flour being carried upwardly within said treatment chamber by the air circulation therein and by the action of said agitating arms, and a screw on said shaft within said first discharge chamber on top of said treatment chamber for positively moving the bran freed of flour in a relatively compact column for discharge therefrom, the positive transport of the bran through said feed chamber at the bottom and through said discharge chamber on top in the form of relatively compact columns confining said air circulation substantially to the area covered by said treatment chamber.

2. The structure defined in claim 1, comprising stirrer arms carried by said shaft within the top region of said first discharge chamber to disperse the bran particles for discharge from said chamber.

3. The structure defined in claim 1, comprising means in said feed conduit for drawing air thereinto with the bran fed to the bottom of said feed chamber.

4. The structure defined in claim 1, comprising stirrer arms carried by said shaft within the top region of said first discharge chamber to disperse the bran particles for discharge from said chamber, and means in said feed conduit for drawing air thereinto with the bran fed to the bottom of said feed chamber.

5. The structure defined in claim 1, comprising agitating arms on said shaft in said feed chamber on top of the screw therein.

6. The structure defined in claim 1, comprising an integral casting on top of said treatment chamber forming said discharge chamber and the top part of said outside wall means, an integral casting at the bottom of said treatment chamber forming said feed chamber and the bottom part of said outside wall means, and a tubular member disposed between said top and said bottom parts forming the central portion of said outside wall means.

7. The structure defined in claim 1, wherein the length of said intermediate treatment chamber is at least twice the length of either said feed or said discharge chamber.

8. The structure defined in claim 1, wherein said perforated wall of said treatment chamber comprises relatively solid sections disposed between adjacent perforated sections.

References Cited in the file of this patent

UNITED STATES PATENTS

| | | |
|---|---|---|
| 308,977 | Obenchain | Dec. 9, 1884 |
| 312,369 | Martin | Feb. 17, 1885 |
| 319,574 | Gathman | June 9, 1885 |
| 319,695 | Gathman | June 9, 1885 |
| 406,931 | Moore | July 16, 1889 |
| 411,799 | Filip | Oct. 1, 1889 |
| 641,329 | Royal | Jan. 16, 1900 |
| 692,011 | Hansen | Jan. 28, 1902 |
| 1,345,273 | Stapp | June 29, 1950 |

FOREIGN PATENTS

| | | |
|---|---|---|
| 3,631 | Great Britain | of 1878 |
| 27,577 | Great Britain | of 1904 |
| 28,590 of 1896 | Great Britain | Nov. 6, 1897 |
| 658,529 | France | Jan. 26, 1929 |
| 858,000 | France | May 6, 1940 |